United States Patent [19]

Ketcham et al.

[11] Patent Number: 6,149,883
[45] Date of Patent: Nov. 21, 2000

[54] PRESSURE OXIDATION PROCESS FOR THE PRODUCTION OF MOLYBDENUM TRIOXIDE FROM MOLYBDENITE

[75] Inventors: Victor J. Ketcham, Salt Lake City, Utah; Enzo L. Coltrinari, Golden; Wayne W. Hazen, Wheat Ridge, both of Colo.

[73] Assignee: Kennecott Utah Copper Corporation, Salt Lake City, Utah

[21] Appl. No.: 08/327,980

[22] Filed: Oct. 24, 1994

[51] Int. Cl.[7] .......................... B01D 11/00; C01G 39/00; C22B 34/30
[52] U.S. Cl. .................. 423/54; 423/55; 423/58; 423/61
[58] Field of Search .................. 423/58, 54, 61, 423/55

[56] References Cited

U.S. PATENT DOCUMENTS

| | | | |
|---|---|---|---|
| 3,455,677 | 7/1969 | Litz | 75/84 |
| 3,598,519 | 8/1971 | Chiola et al. | 423/54 |
| 3,656,888 | 4/1972 | Barry et al. | 23/15 W |
| 3,848,050 | 11/1974 | Jemal | 423/59 |
| 3,896,210 | 7/1975 | Ammann | 423/55 |
| 3,910,767 | 10/1975 | Jemal | 23/264 |
| 4,000,244 | 12/1976 | Möllerstedt | 423/54 |
| 4,046,852 | 9/1977 | Vertes et al. | 423/58 |
| 4,376,647 | 3/1983 | Sohn | 423/61 |
| 4,379,127 | 4/1983 | Bauer et al. | 423/55 |
| 4,444,733 | 4/1984 | Laferty et al. | 423/24 |
| 4,512,958 | 4/1985 | Bauer et al. | 423/55 |
| 4,551,312 | 11/1985 | Yuill | 423/53 |
| 4,551,313 | 11/1985 | Sabacky et al. | 423/59 |

FOREIGN PATENT DOCUMENTS

| | | |
|---|---|---|
| 2830394 | 1/1980 | Germany . |
| 3128921 | 10/1983 | Germany . |
| 331472 | 7/1930 | United Kingdom ..... 423/61 |

OTHER PUBLICATIONS

World Patent Index (Derwent) database printout of Acc't. No. C83–014596 sharing the patent family and English language abstract of DE 3,128,921, no date.

*Primary Examiner*—Steven Bos
*Attorney, Agent, or Firm*—Whyte Hirschboeck Dudek SC

[57] ABSTRACT

Molybdenum trioxide is produced from molybdenite by a pressure oxidation process comprising of the steps of forming an aqueous slurry of molybdenite, pressure oxidizing the slurry to form soluble and insoluble molybdenum species, converting the insoluble molybdenum species to soluble molybdenum species by alkaline digestion, separating the soluble molybdenum species from insoluble residue contaminants (if present), removing the molybdenum species from the aqueous media through solvent extraction, and recovering the molybdenum values as molybdenum trioxide from the organic solvent. Low grade molybdenite concentrates, including concentrator slimes containing talc and sericite, can be used as a feed. The process produces technical grade molybdenum trioxide.

19 Claims, 6 Drawing Sheets

PRESSURE OXIDATION PROCESS FOR THE PRODUCTION OF MOLYBDENUM TRIOXIDE FROM MOLYBDENITE

FIELD OF THE INVENTION

This invention relates to the production of molybdenum trioxide. In one aspect, the invention relates to the production of molybdenum trioxide from molybdenite concentrate while in another aspect, the invention relates to the formation of insoluble molybdenum trioxide during the pressure oxidation of molybdenite concentrate. In yet another aspect, the invention relates to solubilizing the insoluble molybdenum trioxide through the action of an alkaline leach.

BACKGROUND OF THE INVENTION

Molybdenum occurs in nature most commonly as molybdenite ($MoS_2$). While molybdenite may be the primary metal value of an ore body, such as that at Climax, Colo., it is often found as a secondary metal value in a copper ore body, such as that at Bingham Canyon, Utah.

Copper ores only rarely contain sufficient copper to permit direct smelting, and many ores contain less than 1% copper. The copper content of these thin ores must be significantly increased before these materials are worthy to serve as a smelter feed and to this end, these thin ores are subjected to concentration. In this process, the ores are crushed and ground to expose their copper mineralization, and then floated in a series of flotation cells in which the copper minerals are recovered as a froth concentrate and the noncopper-bearing minerals, e.g. silicates and carbonates generally known as gangue, are recovered as tailings.

Many copper flotation facilities comprise three banks of flotation cells, i.e. rougher cells, cleaner cells and scavenger cells. The ore slurry produced during the crushing and grinding of the ore is feed for the rougher cells in which most of the copper mineralization is floated. The froth concentrate from the rougher cells is collected and transferred to the cleaner cells in which much of the remaining gangue is rejected and recycled, while the clean copper concentrate is dewatered and readied for use as a smelter feed. The material that does not float in the rougher cells is transferred to the scavenger cells in which additional copper is recovered. The froth from the scavenger cells is processed to separate gangue from copper mineralization, and the mineral values are returned to the rougher cells.

If molybdenite is present in a copper ore body, then it will usually float with the copper mineralization. As such, the copper concentrate from the cleaner cells is usually processed in a separate flotation circuit to remove the molybdenite before the copper concentrate is readied as a feed to the smelter. The molybdenite is recovered as a molybdenite concentrate, e.g. typically in excess of 90% $MoS_2$ with the remainder mostly silicates and carbonates and various, usually nominal, amounts of other metals such as copper, gold, arsenic, etc. The molybdenite concentrate is then processed to produce molybdenum trioxide which is used primarily as an alloying agent in the production of specialty steels.

If the copper ore body contains nonmetal-bearing, naturally floatable silicate gangue minerals, such as talc and/or sericite, then these minerals will form slimes (because of their soft character), and these slimes tend to follow the copper mineralization during flotation. These slimes are difficult to separate from the molybdenum values and when such a separation is attempted (e.g. by flotation or cycloning), it usually results in the loss of a relatively large amount of the molybdenum values.

Various methods exist or have been proposed for producing molybdenum trioxide from molybdenite concentrate. The dominant technology is roasting in which the concentrate is heated in the presence of excess air to form molybdenum trioxide and sulfur dioxide as a gaseous by-product. While proven, this technology is environmentally difficult and produces an off gas with a low concentration of sulfur dioxide which requires upgrading before it is an economically attractive feed to an acid plant. Additionally, roasting is, as a practical matter, limited to molybdenum concentrates that contain less than 5 wt % copper and less than a total of 10 wt % combined naturally floatable gangue minerals such as talc and sericite. The presence of these substances results in the formation of a sticky material in the roaster that adheres to the rabble arms of conventional multihearth roasters, and interferes with the rejection of fixed sulfur.

One variation on roasting is combining it with sublimation as described in such patents as U.S. Pat. Nos. 3,848,050, 3,910,767, 4,555,387, 4,551,313 and 4,551,312. This process has the merits of producing an off gas relatively rich in sulfur dioxide but remains unproven (i.e. it is yet to be commercialized) and suffers from relatively high losses of molybdenum to byproduct slag produced in the process.

Another variation on roasting is combining it with either a pre- or post treatment step in which the concentrate is contacted with a suitable reagent, e.g. ferric chloride, hydrochloric acid, sodium cyanide, ferric sulfate, sulfuric acid, etc., to remove deleterious base metal impurities such as copper. While generally effective, these variations require, by definition, an extra process step, and the various treatment reagents all have their own undesirable baggage, e.g. cyanide compounds are environmentally disfavored; chloride ion, ferric sulfate and sulfuric acid are corrosive, etc.

Another class of processes for the production of molybdenum trioxide from molybdenite concentrate are hydrometallurgical in nature. In these processes, the concentrate is leached with one of various reagents, e.g. hypochlorite ion. While these processes avoid the production of an off gas, all suffer other disabilities, e.g. hypochlorite is a relatively expensive reagent, and most remain unproven.

One hydrometallurgical process with promising economics and compatibility with the environment is pressure oxidation. In this process, the molybdenite concentrate is slurried with water, and then it is fed to an autoclave in which it is contacted with oxygen under pressure. The process can be conducted either continuously or on a batch basis. Insoluble molybdenum trioxide ($MoO_3$) is recovered by filtration. Several varients of this process are described generally in German patent documents DE3,128,921 and DE2,830,394 as well as U.S. Pat. Nos. 3,656,888; 4,379,127, and 4,512,958.

While all of the known processes for producing molybdenum trioxide from molybdenite concentrate are effective to one degree or another, the mining industry holds a continuing interest for a process that is not only economically efficient, but also has a low environmental impact. In addition, the industry has a continuing interest in developing the ability to process those grades of molybdenite concentrates that contain relatively high levels of impurities such as copper and naturally floatable gangue, e.g. talc and sericite, which are presently difficult to roast to yield molybdenum trioxide of at least technical grade.

SUMMARY OF THE INVENTION

According to one embodiment of this invention, molybdenum trioxide of at least technical grade is produced from a molybdenite concentrate containing molybdenum and nonmolybdenum metal contaminants (e.g. copper, arsenic, iron, etc.) in a process comprising of the steps of:

A. Oxidizing under pressure an aqueous suspension of the concentrate to effect substantially complete conversion of molybdenite to form a soluble hydrous molybdic oxide and insoluble molybdenum trioxide;

B. Separating the soluble molybdic oxide from the insoluble molybdenum trioxide;

C. Converting the insoluble molybdenum trioxide to soluble molybdate values;

D. Mixing the soluble molybdate values of C with the soluble molybdic oxide of A;

E. Extracting the molybdenum values with an organic solvent from the mixture of D such that the majority of the molybdenum values are extracted into the organic solvent and a majority of the metal contaminants remain in the aqueous phase;

F. Crystallizing the extracted molybdenum values of E; and

G. Calcining the crystallized molybdenum values of F to produce molybdenum trioxide.

In this embodiment, the insoluble molybdenum trioxide of step C is converted to soluble molybdate values through the action of a sodium or potassium based reagent, e.g. sodium or potassium carbonate or hydroxide.

In those embodiments of this invention in which the residue from step A (the autoclaving step) filters and washes well (i.e. the residue is quantitatively recovered and the soluble impurities, e.g. copper and sulfates, are readily removed by contacting the filter cake with rinse water), the insoluble molybdenum trioxide of step C can be converted to soluble molybdate values through the action of ammonium hydroxide, and the soluble molybdate values are then advanced directly to step F. This embodiment eliminates the need of combining the soluble molybdate values with the soluble hydrous molybdic oxide to form a mixture from which the values are subsequently removed by solvent extraction.

In yet another embodiment, the insoluble molybdenum trioxide is converted to soluble molybdenum values in step C through the action of lime (CaO) or magnesium hydroxide (the former preferred for economic reasons). The soluble molybdate values are then combined with the solution containing soluble molybdic oxide of step A while maintaining a pH of less than 2, and then filtered. The filtrate is forwarded to step E for solvent extraction of the molybdenum values for subsequent crystallization and calcination to molybdenum trioxide.

Copper values present in the molybdenite concentrate are also oxidized in step A, and the oxidized copper values from the raffinate of step E are recovered by any conventional technique, e.g. solvent extraction, electrowinning, precipitation as a sulfide, etc. Precipitated copper sulfide is a suitable smelter feed and depending upon its purity, copper recovered by electrowinning may be sold as either cathode copper or melted to make anodes for further processing. The waste liquor from the copper recovery steps is neutralized and disposed of in an environmentally acceptable manner.

In all three of the above-described embodiments of this invention, gangue is separated from the molybdenum and copper values, and then typically returned to a smelter for further processing to recover additional metal values. In the second embodiment of this invention, i.e. those in which the insoluble molybdenum trioxide is converted to soluble molybdate values through the action of a ammonium hydroxide, the gangue is rejected (typically by filtration) just prior to the crystallization of the soluble molybdate values. In the first and third embodiment of this invention, i.e. that in which the insoluble molybdenum trioxide is converted to soluble molybdate values through the action of a sodium or potassium compound or lime, the gangue is rejected (again typically by filtration) just prior to the solvent extraction step.

The process of this invention can successfully recover molybdenum trioxide from a wide range of molybdenite concentrate grades including those which are unsuitable for conventional multihearth roasting and are now routinely combined with a copper smelter feed, i.e. those that contain more than 5 wt % copper and more than 10 wt % of naturally floatable gangue minerals, e.g. talc and sericite. As a consequence, the process of this invention allows a greater recovery of molybdenum values (as measured from ore body to final product, i.e. $MoO_3$) than by conventional techniques, particularly roasting, and it produces a molybdenum trioxide of higher purity than that produced by roasting.

DESCRIPTION OF THE PREFERRED EMBODIMENTS

Figure 1:
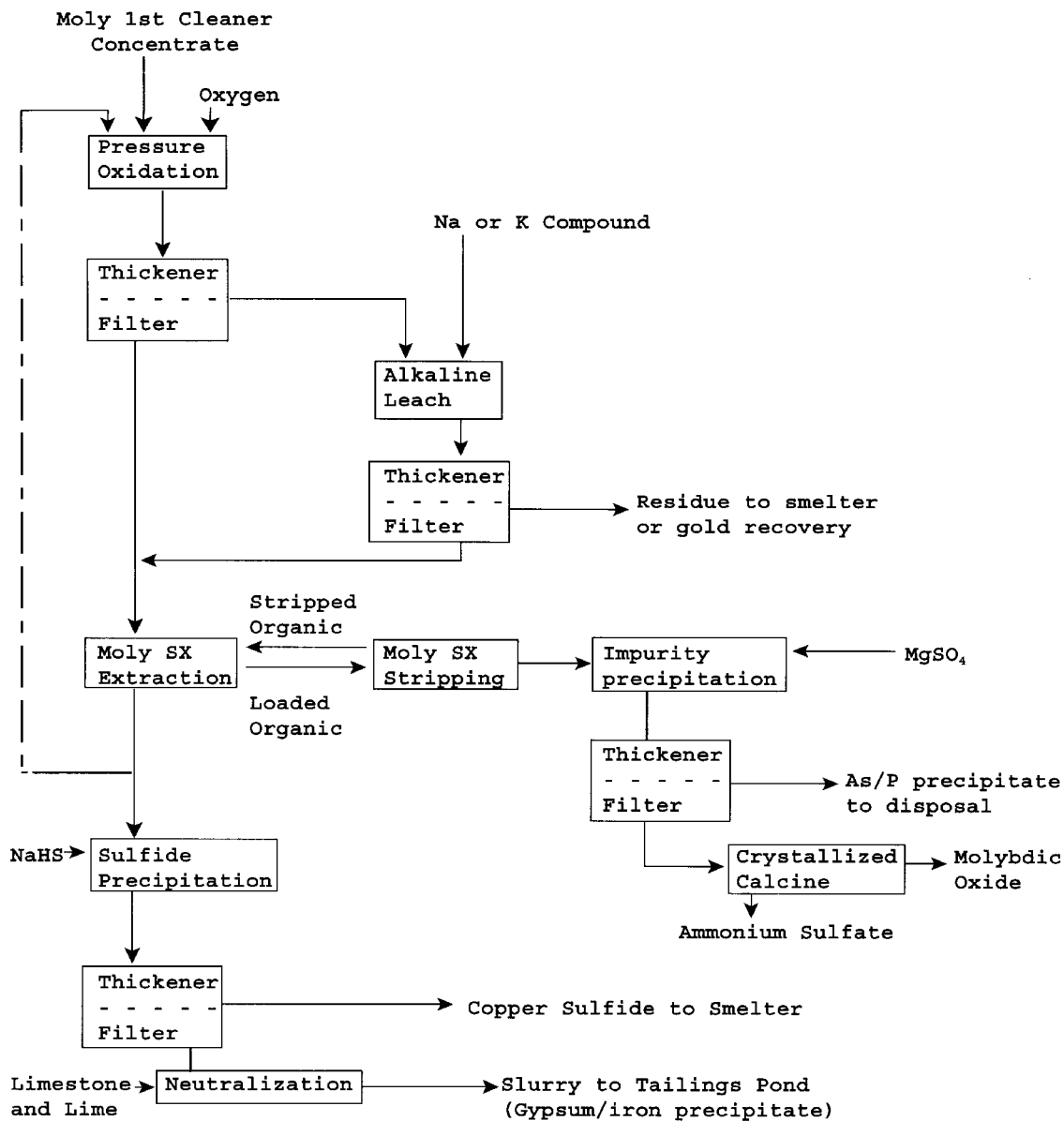
FIG. 1 is a schematic flow diagram of one embodiment of the process of this invention in which insoluble $MoO_3$ is solubilized through the action of an alkali metal compound.

Referring to FIG. 1, the molybdenite concentrate starting materials of this invention (i) contain an economically significant amount of $MoS_2$, e.g. as low as 10%, but typically at least about 20% and preferably at least about 50%, (ii) are typically in the form of finely divided particles of a size usually less than 100 mesh (U.S. standard), and (iii) can include concentrates which were not processed previously because they contained unacceptably large amounts of insoluble gangue minerals, e.g. talc and sericite. The starting material concentrates of this invention are the product of typical ore beneficiation processes, and the concentrates produced from the cleaner flotation cells in the molybdenum recovery circuit are preferred. These concentrates are usually in the form of a slurry or filter cake containing small amounts of hydrocarbon flotation oils. These concentrates do not require pretreatment, but if desired, the concentrates can be subjected to retorting, scrubbing with a strong alkali solution, or other treatment which removes or reduces the amounts of flotation oils in the concentrate.

The concentrates used in this invention contain other materials such as silica, feldspars, naturally floatable gangue minerals such as talc and sericite, various phosphorus values, and other (nonmolybdenum) metals such as copper, iron, arsenic, gold, silver, rhenium, etc. These other materials are present in varying amounts, particularly the metals, although the process of this invention is particularly well adapted for recovering molybdenum values from concentrates with relatively large amounts of copper values, e.g. in excess of 5 weight percent, and relatively large amounts of naturally floatable gangue minerals, e.g. in excess of 10 weight percent, that create difficulties in traditional roasting processes.

The particle size of the concentrate material, measured in terms of $P_{80}$ (80% by weight of the concentrate can pass through a screen of designated mesh size), can vary, although concentrates of relatively small particle size, e.g. $P_{80}$ at 200 or finer mesh and preferably $P_{80}$ at 325 or finer mesh, are preferred. This small particle size facilitates the oxidation step by facilitating dispersion and maximizing surface area.

In the first process step of this invention, molybdenite concentrate is slurried with water or an aqueous solution of metal salts and/or acid to a solids concentration of between about 5 and 40, preferably between about 10 and 30, percent by weight, and is fed to an autoclave on either a batch or continuous basis. The autoclave itself can be of any suitable design, but it is typically equipped with agitation means, e.g. one or more propeller stirrers, and baffled into two or more compartments. While the oxidation reaction proceeds at ambient pressure and temperatures below 100 C, the reaction conditions are chosen such that the sulfur bound to the molybdenum is essentially completely oxidized in a reasonably short period of time, e.g. one to five hours. "Essentially completely oxidized", "substantially complete conversion of molybdenite", and like terms means that at least about 90, preferably at least about 95, and more preferably at least about 97, percent of the $MoS_2$ is oxidized to molybdenum oxides, either soluble or insoluble.

Preferred reaction rates occur at temperatures in excess of 100 C, preferably in excess of 150 C, and more preferably at or in excess of about 200 C, and at a partial pressure of free oxygen in excess of 25 psi, preferably in excess of about 75 psi. The maximum partial pressure of free $O_2$ is a function of the autoclave design, but typically it does not exceed about 600 psi, preferably it does not exceed about 200 psi. The oxygen can be introduced as pure oxygen, oxygen-enriched air or air, although pure oxygen or oxygen-enriched air are preferred for obvious reasons.

The oxidation reaction is allowed to proceed to substantial completion, the exact time dependent upon a host of factors such as temperature, pressure, agitation rates, slurry density, particle size, etc. The product of the oxidation reaction includes soluble molybdic oxide, insoluble molybdenum trioxide, and soluble metal sulfate values, e.g. copper and ferric sulfate produced from the oxidation of chalcopyrite, insoluble minerals such as talc and sericite, etc. These oxidation reactions are described by the following equations:

$$MoS_2 + 3H_2O + 5\tfrac{1}{2}O_2 \rightarrow MoO_3 \cdot H_2O_{(soluble)} + 2H_2SO_4 \quad (I)$$

$$MoS_2 + 2H_2O + 5\tfrac{1}{2}O_2 \rightarrow MoO_{3(insoluble)} + 2H_2SO_4 \quad (II)$$

$$2CuFeS_2 + 8\tfrac{1}{2}O_2 + H_2SO_4 \rightarrow 2CuSO_4 + Fe_2(SO_4)_3 + H_2O \quad (III)$$

The soluble molybdic oxide, represented as the general chemical formula $MoO_3 \cdot H_2O_{(soluble)}$ for convenience, can be present in solution as one or more of a range of anions including $MoO_4^{-2}$, $HMO_3O_{11}^{-3}$, $H_3MO_6O_{21}^{-3}$, $H_9MO_{24}O_{78}^{-3}$, etc. depending upon of the solution.

Rhenium, which is generally present in molybdenite concentrates as a solid solution contaminate in the molybdenite mineral, is oxidized to yield soluble perrhenic acid.

Similar equations can be written for the other metals values that are oxidized during this process step.

After the oxidation reaction is completed, the solid fraction of the reaction mass is separated from the liquid fraction by any conventional technique, typically a combination of thickening and filtration. In a hallmark feature of this embodiment (FIG. 1), the undissolved molybdenum trioxide in the solid fraction is converted to a soluble alkaline molybdate, preferably a soluble sodium molybdate, with an alkali metal, e.g. sodium, potassium, etc., compound. While any alkali metal material that will solubilize the insoluble molybdenum trioxide can be used in this step of the invention (e.g. sodium and potassium hydroxide, carbonates and bicarbonates), soda ash ($Na_2CO_3$) is preferred because of its low cost, wide availability, and ease of use. The reaction of soda ash with molybdenum trioxide is described in equation IV.

$$MoO_{3(insoluble)} + Na_2CO_3 \rightarrow Na_2MoO_{4(soluble)} + CO_2 \quad (IV)$$

The digestion or solubilization of the molybdenum trioxide with soda ash is conducted preferably at ambient pressure conditions in two or more digestors operated continuously in series, each equipped with agitation means. The density of the reaction mass is a function of the molybdenum content of the solids generated in the pressure oxidation stage and of the alkali metal solution strength (e.g. the greater the soda ash strength, the greater the molybdenum content, and the greater the solids density). The pressure oxidation and digestion stages are operated such that the concentration of molybdenum in the liquid fraction of the slurry at the liquid-solid separation phase of this step is preferably between about 10 and 100 grams per liter (g/l). The slurry is subjected to any conventional liquid-solid separation technique, e.g. belt filtration, and the filtrate is then combined with the liquid fraction from the pressure oxidation of the original feed slurry. The precipitate or filter cake is treated by any conventional means for recovery of the residual metal values, e.g. silver, gold, etc.

The mixture of the liquid fractions from the pressure oxidation and alkaline leach steps, the former the dominant portion of the mixture and typically comprising at least about 70 volume percent of the mixture, is typically acid in pH as a result of the acid produced during the pressure oxidation stage. If the mixture is not sufficiently acid to maintain the molybdenum values soluble during solvent extraction for any reason, then it is re-acidified or in other words, sufficient acid, e.g. sulfuric acid, is added to the mixture such that the solubility of the molybdenum values is maintained during the solvent extraction. The temperature of the mixture during re-acidification, if necessary, can vary to convenience, but the temperature of the mixture is usually reduced to less than about 40 C prior to contact with the extracting solvent. The chemistry of the re-acidification reaction is described by equation V. (V)

$$Na_2MoO_4 + H_2SO_4 \rightarrow Na_2SO_4 + MoO_3 \cdot H_2O^{(soluble)} \quad (V)$$

The chemistry of the molybdenum solvent extraction is described in equations VI and VII for one possible anionic form of soluble molybdic oxide. Similar equations can be written for other possible anionic forms of the soluble molybdic oxide.

$$R_3N + H_2SO_4 \rightarrow (R_3NH)HSO_4 \tag{VI}$$

$$3(R_3NH)HSO_4 + (H_9Mo_{24}O_{78})^{-3} \rightarrow (R_3NH)_3(H_9Mo_{24}O_{78}) + 3(HSO_4)^{-3} \tag{VII}$$

Any conventional solvent extraction technique can be used in the practice of this invention, and it can be conducted in a single or multi-step manner. The extracting solvent usually comprises an organic solvent in combination with a nonprimary amine (e.g. a secondary or tertiary amine) in which the extractant contacts the dissolved, molybdenum-containing liquid fractions of the pressure oxidation and alkaline leach steps in a countercurrent manner. The contact is conducted at or near ambient temperature and pressure, and the extraction of the molybdenum values is near quantitative. Representative tertiary amines include tri-caprylyl amine (e.g. Alamine 336) and tri-auryl amine (e.g. Alamine 304). A wide range of other secondary and tertiary amines may also be used provided that their molecular structure includes at least one hydrocarbyl group of sufficient molecular weight to effectively limit their solubility in the aqueous phase (e.g. containing $\geq 6$ carbon atoms).

Quaternary amines may also be used, but molybdenum loaded on quaternary amines in the organic phase is more difficult to recover in the stripping stage, requiring a stronger stripping agent than ammonium hydroxide, and their use in this stage of the process is therefore not preferred.

A range of organic solvents derived from petroleum or coal liquids may be used, including those of aliphatic or aromatic nature as well as mixtures of the two. In similar applications of solvent extraction for recovery of molybdenum, others (Mollerstad, U.S. Pat. No. 4,000,244, Lafferty U.S. Pat. No. 4,444,733 and Litz, U.S. Pat. No. 3,455,677) teach that the addition of one or more modifiers, such as a high molecular weight alcohol or alkyl phosphate esters, to the organic solvent is required to prevent the formation of stable emulsions (also known as a "third phase") when molybdenum loadings of greater than about 10 g/l Mo in the organic phase are desired. Although we have found this to be true when using a solvent of full or partial aliphatic nature, we have discovered that modifiers are not required to prevent the formation of stable emulsions if an exclusively aromatic solvent, such as that marketed under the trademark Aromatic 150, is employed.

Excess organic material is removed from the aqueous raffinate of the solvent extraction step by any conventional technique, e.g. skimming, and the metal values in the raffinate are then recovered by any conventional technique such as solvent extraction/electrowinning (SXEW), direct electrowinning, and precipitation as a sulfide through the action of any sulfiding agent, e.g. hydrogen sulfide ($H_2S$), sodium hydrogen sulfide (NaHS), etc. The precipitate is then separated from the filtrate by conventional technique, e.g. thickening and filtering, and the solid fraction is transferred to a smelter for recovery of copper and/or other metal values while the aqueous fraction is neutralized with any suitable neutralizing agent, e.g. limestone, milk of lime, etc. which precipitates gypsum ($CaSO_4 \cdot 2H_2O$) and iron hydroxides which can then be transferred to a tailings pond for disposal.

The molybdenum-loaded organic phase from the solvent extraction process is first scrubbed with an acid solution, e.g. sulfuric acid, to remove any entrained raffinate (which contains copper and iron values). The scrubbed organic phase is then contacted with a stripping medium to recover the molybdenum values. The stripping medium is typically an aqueous alkaline solution, e.g. ammonium hydroxide, that is selective for the molybdenum values. Silica-containing precipitate may form in the strip stages, and is removed from the aqueous phase (usually by filtration) for ultimate recovery and disposal. If present, other deleterious impurities, e.g. arsenic, phosphorus, etc., can be removed at this stage by the addition of a precipitating agent such as magnesium sulfate ($MgSO_4$). This precipitate is recovered with the silica-containing precipitate for appropriate recycle or disposal.

The stripped organic phase is cleaned of residual values, and then recycled to the solvent extraction phase. The chemistry of this solvent stripping step is described in equations VIII and IX (and as noted earlier, similar equations can be written for other possible anionic forms of the soluble molybdic oxide).

$$(R_3NH)_3(H_9Mo_{24}O_{78}) + 48NH_4OH \rightarrow 3R_3N + 24(NH_4)_2MoO_4 + 30H_2O \tag{VIII}$$

$$(R_3NH)HSO_4 + 2NH_4OH \rightarrow R_3N + (NH_4)_2SO_4 + 2H_2O \tag{IX}$$

The purified and loaded strip liquor is admixed with a crystallizer mother liquor at a ratio dictated by the desired crystal size and performance characteristics of the crystallizer, and the combination is subjected to crystallization by any conventional technique. Typically, crystallization is performed by evaporation at an elevated temperature and/or reduced pressure. Crystals are recovered from the mother liquor by centrifugation or other liquid-solid separating technique, and the bulk of the molybdenum values are recovered as diammonium molybdate (ADM) or diammonium paramolybdate. The chemistry of crystallization, for an ADM product, is described in equation X.

$$2(NH_4)_2MoO_4 \rightarrow (NH_4)_2Mo_2O_7 + H_2O + 2NH_3 \tag{X}$$

To avoid saturation of the mother liquor with impurities, a portion of the mother liquor may be treated separately rather than recycled to the crystallizer. In this side stream, the residual molybdenum values in the crystallizer mother liquor are recovered by precipitating molybdenum from solution (generally accomplished by acidifying the mother liquor with any suitable acid, e.g. sulfuric acid). The molybdenum precipitates as a solid containing a mixture of hydrous molybdenum trioxide and a range of possible ammonium molybdate species—$(NH_4)_5HMo_6O_{21} \cdot H_2O$, $(NH_4)_6Mo_7O_{24} \cdot H_2O$, etc. —the compositions of which depends on the precise pH and temperature of precipitation. The chemistry of this precipitation is described generally in equations XI and XII.

$$(NH_4)_2MoO_4 + H_2SO_4 \rightarrow MoO_3 \cdot H_2O_{(solid)} + (NH_4)_2SO_4 \tag{XI}$$

$$7(NH_4)_2MoO_4 + 4H_2SO_4 \rightarrow (NH_4)_6Mo_7O_{24} \cdot H_2O_{(solid)} + 4(NH_4)_2SO_4 + 3H_2O \tag{XII}$$

The residual molybdenum recovery solids are separated from the solution, generally by filtration, and are recycled to the crystallizer in which the molybdenum is converted to ADM for subsequent drying and calcining.

The residual molybdenum recovery solids and ADM are dried to a moisture content of less than about ten percent, preferably less than about five weight percent, and then calcined to remove ammonia and recover molybdenum trioxide. Hydrous molybdenum trioxide is dehydrated during calcination. Any conventional calciner can be used in this step, and the calcination temperature is usually in excess of 450 C, preferably at or in excess of 575 C. The process chemistry of the calcination is described in equations XIII, XIV and XV. Similar equations can be written for other ammonium molybdate species.

$$(NH_4)_2Mo_2O_7 \rightarrow 2MoO_3 + 2NH_3 + H_2O \quad \text{(XIII)}$$

$$MoO_3 \cdot H_2O_{(solid)} \rightarrow MoO_3 + H_2O \quad \text{(XIV)}$$

$$(NH_4)_2SO_4 \rightarrow 2NH_3 + SO_3 + H_2O \quad \text{(XV)}$$

Ammonia is recovered from the crystallizer and calciner off gases as ammonium hydroxide, and recycled, as is process water. Solution from the residual molybdenum recovery step contains ammonium sulfate, which is recovered by evaporating the solution to dryness. The recovered molybdenum trioxide is cooled and packaged for shipment. Dust-laden off gases are processed to recover product, recycle process reagents, and to emit clean discharges to the environment.

Rhenium present in the molybdenite concentrate is substantially completely recovered in step E of the process (solvent extraction) and reports to the purified and loaded strip solution as ammonium perrhenate, $NH_4ReO_4$. If desired, this rhenium may be recovered by solvent extraction or, preferably, ion exchange resin processing of the purified and loaded strip solution, crystallizer mother liquor, or ammonium hydroxide recycle stream using an extractant or ion exchange resin with a high selectivity for rhenium over molybdenum in alkaline solutions. Quaternary amine extractants and ion exchange resins containing quaternary amine functional groups such as that marketed under the trademark Amberlite IRA-400, are preferred.

Rhenium can then be recovered from the loaded organic (solvent extraction option or ion exchange resin using any one of several established stripping and upgrading processes for the production of crude or purified ammonium perrhenate, perrhenic acid, or rhenium sulfide. Suitable stripping agents include perchloric acid and ammonium thiocyanate. As taught in U.S. Pat. No. 3,558,268, the later is preferred due to its higher inherent safety and simpler upgrading process for the production of ammonium perrhenate.

If rhenium is not selectively recovered, a portion of it co-precipitates with molybdenum in the ADM and the residual molybdenum recovery solids. As these intermediate products are calcined to molybdenum trioxide, their contained rhenium is converted to rhenium oxide, $Re_2O_7$, which is volatile at calcination temperatures, is driven off with ammonia, and is recovered and recycled in an ammonium hydroxide solution. In a continuous process, this rhenium recycle continues to build up until that portion of the rhenium contained in purified strip solution which reports to the ammonium sulfate product represents substantially all of the rhenium solubilized in the autoclave, at which point the rhenium in recycle is maintained at a stable steady-state level. In another embodiment of this invention (FIG. 2), ammonium hydroxide ($NH_4OH$) replaces the sodium or potassium compound (e.g. soda ash) in the alkali leach stage (Step C). This embodiment is particularly well adapted for use on those residues from the autoclave stage (Step A) that filter and wash well, and thereby leaving low levels of soluble contaminants, such as copper or arsenic, in the filter cake. The $NH_4OH$ reacts with the insoluble $MoO_3$ according to equation XVI.

$$MoO_{3(soluble)} + 2NH_4OH \rightarrow (NH_4)_2MoO_{4(soluble)} + H_2O \quad \text{(XVI)}$$

After separation from the solid fraction, the soluble molybdenum values are transferred directly to the crystallization stage for further processing, as opposed to the solvent extraction stage as in the embodiment described in FIG. 1.

Figure 2:
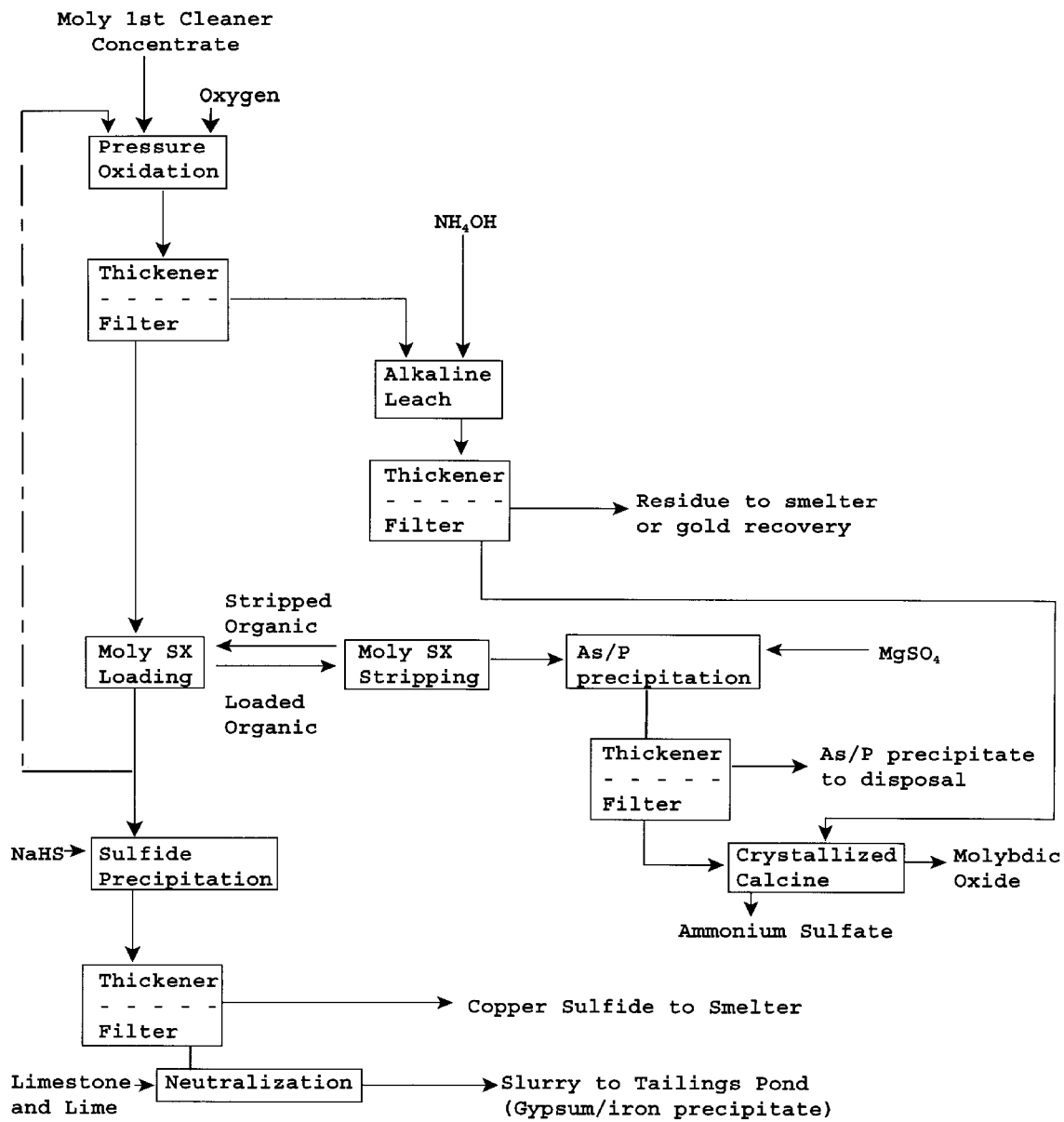
FIG. 2 is a schematic flow diagram of another embodiment of the process of this invention in which insoluble $MoO_3$ is solubilized through the action of ammonium hydroxide.

In yet another embodiment (FIG. 3), lime or magnesium hydroxide replaces the alkali metal compound of the FIG. 1 embodiment or the $NH_4OH$ of the FIG. 2 embodiment. This embodiment of FIG. 3, like the embodiment of FIG. 1, is well adapted for autoclave residues of all natures, i.e. regardless of whether or not the residue filters or washes well, and the $Mg(OH)_2$ reacts with the insoluble $MoO_3$ according to the equation XVII.

$$MoO_{3(insoluble)} + Mg(OH)_2 \rightarrow MgMoO_{4(acid\ soluble)} + H_2O \quad \text{(XVII)}$$

If lime replaces $Mg(OH)_2$, then $MoO_3$ is converted to an acid soluble form according to equation XVIII.

$$MoO_{3(soluble)} + CaO \rightarrow CaMoO_{4(acid\ soluble)} \quad \text{(XVIII)}$$

In either case, the unseparated reaction product (both liquid and solid fractions) is admixed with the liquid fraction from the autoclave stage, if necessary additional acid is added to maintain a pH of 2 or less, and then the resulting mixture separated by any conventional technique into its liquid and solid constituent parts. The solids fraction (e.g. filter cake) is sent to a smelter or gold recovery operation for further processing, while the liquid fraction is transferred to the solvent extraction stage.

The process of this invention is more fully described by the following Examples. Unless indicated to the contrary, all parts and percentages are by weight.

SPECIFIC EMBODIMENTS

Comparative Example: Conventional Technology

Molybdenum is presently recovered from copper ore mined at Bingham Canyon, Utah in the form of a molybdenite concentrate. This concentrate is shipped to commercial roasting facilities employing conventional multihearth roasting technology for conversion of the molybdenite to technical grade molybdenum trioxide which is sold to end users, principally in the alloy steel manufacturing industry.

The molybdenum trioxide produced must meet a number of minimum quality specifications for technical grade product if it is to be successfully marketed. The most relevant of these minimum quality specifications are listed in Table 1. To achieve these quality specifications in the final molybdenum trioxide product from a conventional roaster, the molybdenite concentrate from which it is produced must also meet a number of corresponding minimum quality standards. Minimum quality specifications for molybdenite concentrates required by the roasting facilities currently processing molybdenite concentrate from Bingham Canyon are also listed in Table 1.

TABLE 1

Minimum Commercially Acceptable Quality Specifications for Conventional Molybdenum Trioxide Production Process

| Species | Technical Grade Molybdenum Trioxide % | Roaster Feed Molybdenite Concentrate % |
|---|---|---|
| Mo | >55 | >50 |
| Cu | <0.5 | <0.5 |
| As | <0.03 | <0.03 |
| P | <0.05 | <0.05 |
| Pb | <0.05 | <0.05 |
| S | <0.15 | — |

TABLE 1-continued

Minimum Commercially Acceptable Quality
Specifications for Conventional
Molybdenum Trioxide Production Process

| Species | Technical Grade Molybdenum Trioxide % | Roaster Feed Molybdenite Concentrate % |
|---|---|---|
| Naturally floatable gangue minerals (talc & sericite) | — | <10 |

Copper and molybdenum are recovered from Bingham Canyon ore in a multiple-stage process beginning with crushing and grinding of the ore, followed by three stages of flotation to produce a bulk copper and molybdenum sulfide mineral concentrate containing about 27.5% Cu as copper sulfide minerals, about 1.8% Mo as molybdenite, and about 14% gangue minerals including about 1% to 5% naturally floatable talc and sericite.

Figure 4:
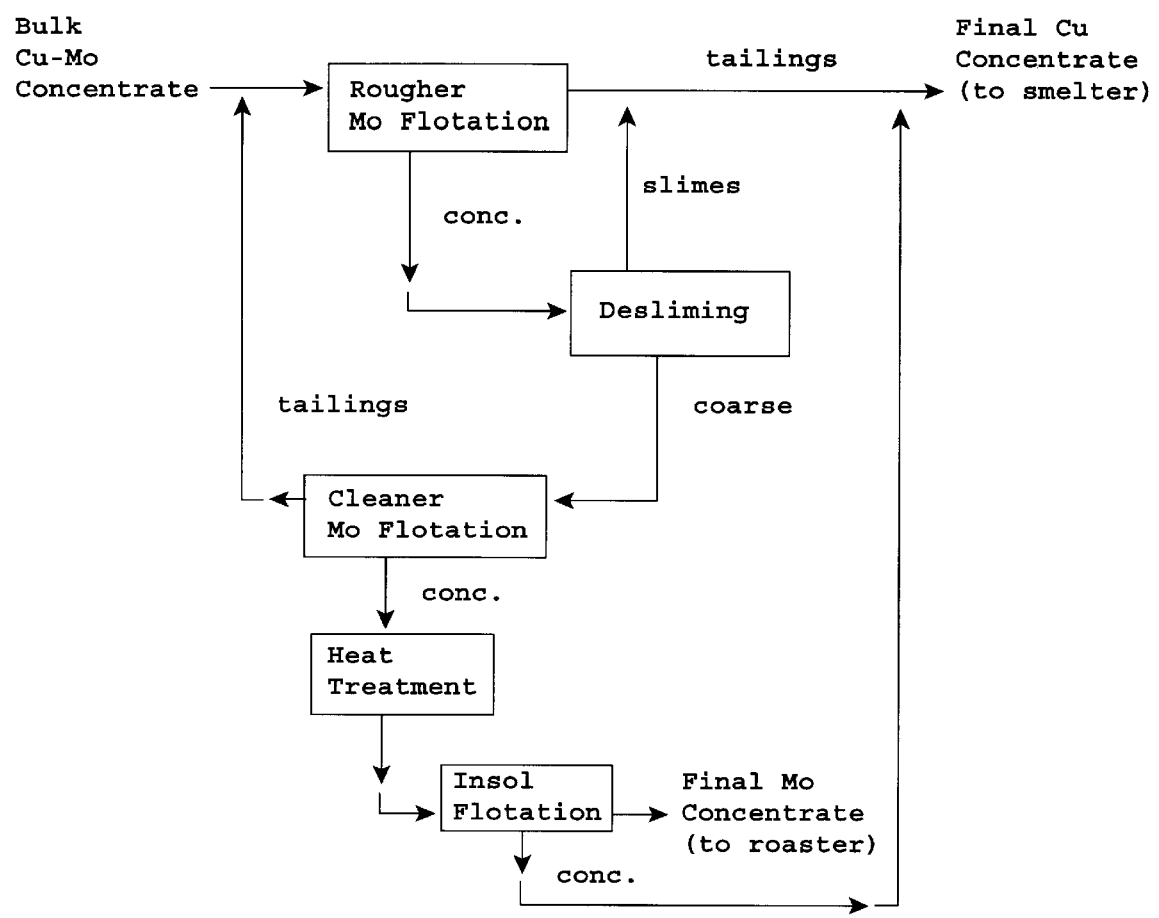
FIG. 4 is a schematic flow diagram of a conventional process for molybdenum recovery from copper-molybdenum concentrate.

The bulk copper and molybdenum concentrate is subjected to further processing to separate a majority of the contained molybdenum into a molybdenite concentrate meeting the minimum specifications listed in Table 1. The remaining material forms a final copper concentrate which is fed to smelters for recovery of its contained copper and precious metals values. This separation process is shown in FIG. 4 and consists of the following stages:

Rougher Molybdenum Flotation.

Copper minerals are depressed by the addition of a suitable chemical reagent and molybdenite is collected in the concentrate. Because of their natural floatability, a majority of the talc and sericite minerals in the bulk concentrate follow the molybdenite. Tailings from this stage report to the final copper concentrate which is feed to copper smelters, and the rougher concentrate reports to the desliming stage.

Desliming.

The rougher molybdenum concentrate is deslimed in cyclones for removal of talc and sericite fines which cannot be successfully separated from molybdenite by flotation processes. In addition to talc and sericite, the fines produced in this cycloning step also contain copper and precious metals values. These fines report to final copper concentrate. Fine molybdenite is also unavoidably removed in cycloning and forms a portion of the fines stream reporting to copper concentrate, thereby causing a significant loss in molybdenum recovery for this conventional process. The deslimed concentrate proceeds to the cleaner molybdenum flotation stage.

Cleaner Molybdenum Flotation.

The deslimed concentrate is reground and subjected to further cleaning flotation steps where additional copper is rejected to an intermediate molybdenum cleaner tailings stream which is recycled and combined with bulk copper molybdenum concentrate feeding rougher molybdenum flotation. Cleaner molybdenum flotation concentrate (consisting predominantly of molybdenite, talc and sericite) advances to the heat treatment stage.

Heat Treatment.

Cleaner molybdenum concentrate is filtered, dried, and subjected to a thermal treatment which removes flotation reagents from the contained molybdenite mineral, thereby inhibiting the floatability of molybdenite in the insol flotation stage. The natural floatability of talc and sericite is not effected by this heat treatment.

Insol Flotation.

The heat-treated concentrate is subjected to several stages of insol flotation. In this "reverse" flotation process (where the more valuable sulfide mineral is depressed and the less valuable gangue minerals are floated), talc and sericite are removed as a froth concentrate and molybdenite is depressed and remains in the tailings stream from this flotation stage. This "tailings" stream from insol flotation is the final molybdenite concentrate from the process, meeting the minimum quality specifications listed in Table 1. It is filtered, dried and bagged for shipment to roasting facilities. The insol flotation "concentrate" reports to the final copper concentrate.

In the above process, overall recovery of molybdenum contained in Bingham Canyon ore to the final molybdenite concentrate averages about 50%, and multi-hearth molybdenum roasting facilities typically achieve about 99% stage recovery of molybdenum contained in concentrate to technical grade molybdenum trioxide product. Actual average performance of the existing Bingham Canyon molybdenite recovery process over eight days during which samples were taken for the tests described in Examples 1 through 6 is summarized in Table 2.

TABLE 2

Molybdenum Recoveries and Product Grades for
Conventional Process at Bingham Canyon Mine

| Molybdenum recovery from ore, % | |
|---|---|
| to Cu-Mo bulk concentrate feeding rougher Mo flotation stage: | 84.3 |
| to Mo rougher concentrate produced in rougher Mo flotation stage: | 78.8 |
| to final Mo concentrate produced in insol flotation stage: | 50.4 |
| to saleable technical grade molybdenum trioxide product (after roasting stage losses): | 49.9 |
| Final molybdenum concentrate grade, % | |
| Mo | 52.3 |
| Cu | 0.39 |
| Equivalent grade of molybdenum trioxide produced from final molybdenum concentrate, % | |
| Mo | 57.3 |
| Cu | 0.43 |

EXAMPLE 1

Improved Flotation Recovery Without Desliming for Removal of Talc and Sericite

Figure 5:
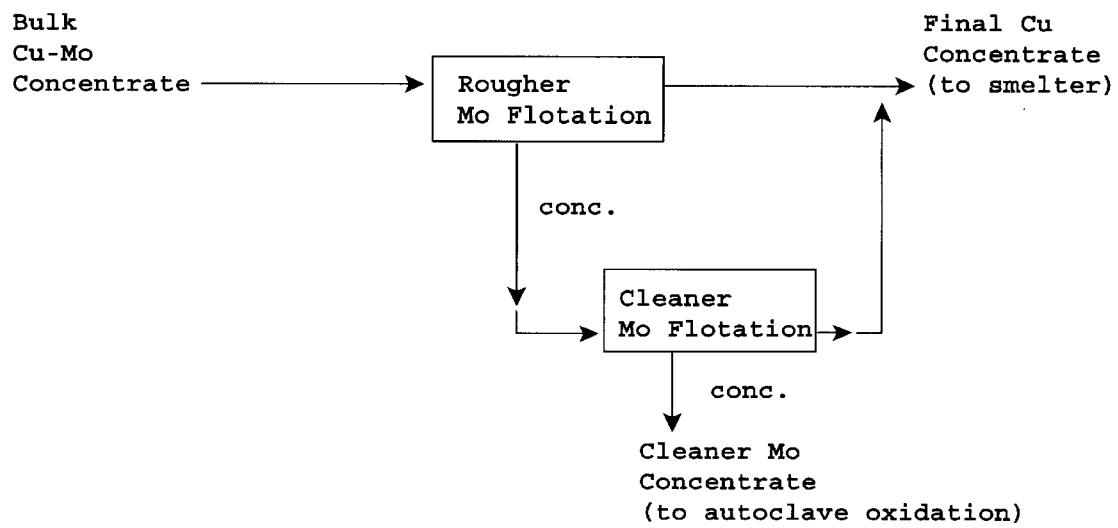
FIG. 5 is a schematic flow diagram of a modified molybdenum flotation circuit.

A modification of the Bingham Canyon molybdenum concentrating circuit described in the Comparative Example was tested. These modifications are illustrated in FIG. 5 and described below.

Rougher Molybdenum Flotation.

This stage, which treats bulk copper molybdenum concentrates to produce a rougher molybdenum flotation concentrate, is identical to the rougher molybdenum flotation stage in the Comparative Example.

Cleaner Molybdenum Flotation.

The rougher molybdenum concentrate produced in the rougher molybdenum flotation stage is, without desliming or regrinding, subjected to a single stage of cleaner flotation where additional copper is rejected to a molybdenum cleaner tailings stream which joins rougher molybdenum tailings to form final copper concentrate. The cleaner molybdenum concentrate produced in this stage, which also contains a majority of the naturally floatable talc and sericite minerals contained in the bulk copper molybdenum concentrate, forms the feed of the autoclave oxidation stage of Examples 2 through 4.

Over the same eight days for which Table 1 documents performance of the conventional Bingham Canyon molybdenum recovery process, this modified flotation flowsheet was tested by sampling rougher molybdenum concentrate in the commercial plant and performing the cleaner molybdenum flotation stage in a laboratory flotation machine. Average recoveries and product grades for this modified flotation process during these eight days is shown in Table 3.

TABLE 3

Simplified Flotation Process

| | Range % | Average % |
|---|---|---|
| Molybdenum recovery from ore to: | | |
| bulk copper molybdenum concentrate feeding the rougher molybdenum flotation stage: | 76.1–91.7 | 84.3 |
| rougher molybdenum concentrate produced in the rougher molybdenum flotation stage: | 74.2–88.4 | 78.8 |
| cleaner molybdenum concentrate produced in the cleaner molybdenum flotation stage: | 65.2–85.8 | 76.1 |
| Grade of cleaner molybdenum concentrate produced in the cleaner molybdenum flotation stage: | | |
| Mo | 12.0–31.7 | 20.7 |
| Cu | 2.1–4.9 | 3.3 |

EXAMPLE 2

Soda Ash Digestion

Several bulk samples of cleaner molybdenum concentrate, including samples PP1 and PP2, were produced at the Bingham Canyon mine by temporarily repiping the existing circuit to match the flowsheet shown in FIG. 5. These samples were used as feed material to laboratory tests of various embodiments of the invention, including the embodiment illustrated in FIG. 1 in which insoluble $MoO_3$ is solubilized through the action of an alkali metal hydroxide and, as an optional step in the process, a portion of the molybdenum solvent extraction (MoSX) raffinate solution can be recycled to the autoclave.

As one step in a series of locked cycle tests (tests in which the intermediate products of one batch test are recycled to the subsequent test thereby mimicking a continuous commercial-scale process), a 19% solids slurry of the PP1 sample was prepared using molybdenum solvent extraction raffinate solution from a previous test cycle. The slurry mixture was placed in an agitated batch autoclave, the temperature and pressure of the autoclave was brought to and controlled at about 200 C and 310 psig, and oxygen gas was sparged into the slurry for a period of 2 hours. Pressure on the autoclave was then relieved and the oxidized slurry was cooled to about 90 C, a small sample of the slurry was removed for assay, and the remaining slurry was filtered. The filter cake was washed with demineralized water.

Filtered and washed autoclave residue solids were repulped at about 55 C with demineralized water and $Na_2CO_3$ at 30% solids. A total of 2.7 kg of $Na_2CO_3$ per kg of Mo in the autoclave residue was used, yielding a digestion pH of about 8.5. The slurry was agitated for 2 hours, after which the slurry was filtered and the filter cake washed with demineralized water. Accounting for the removal of assay samples, digested residue solids contained 63% of the original mass of autoclave feed solids and consisted predominantly of gangue minerals.

The primary filtrate (containing undiluted autoclave discharge solution) and first wash filtrate (filtrate collected during the first stage of the cake washing which contains autoclave discharge solution slightly diluted with wash water) from the autoclave discharge were combined with the primary filtrate from the digestion phase. Secondary wash filtrates, containing low concentrations of molybdenum, were weighed and assayed in this laboratory example but in a commercial-scale application would be recycled and used as feed water in earlier stages of the process for recovery of their contained molybdenum values.

Molybdenum was recovered from the combined filtrate by solvent extraction using a tertiary amine extractant in an aromatic organic solvent. Molybdenum was recovered from the loaded organic phase by stripping with a 3 to 4 normal ammonium hydroxide solution producing a concentrated ammonium molybdate aqueous solution. After stripping, the barren organic phase was reused in the solvent extraction stage of the next locked cycle test (Example 4).

Feed and product assays as well as stage recoveries of molybdenum and copper achieved in this test are summarized in Table 4.

TABLE 4

Soda Ash Digestion Test Results

| | Assay, % solids, g/l solutions | | | |
|---|---|---|---|---|
| | Mo | Cu | $S^{-2}$ | $H_2SO_4$ |
| Autoclave feed solids | 15.7 | 3.80 | 14.4 | — |
| Autoclave feed solutions | 0.063 | 24.4 | — | 53 |
| Primary & first wash autoclave filtrate | 29.0 | 29.1 | — | 109 |
| Autoclave residue solids | 3.6 | 0.01 | 0.24 | — |
| $Na_2CO_3$ digestion primary filtrate | 14.8 | — | — | |
| $Na_2CO_3$ digestion residue solids | 0.24 | .014 | 0.25 | — |
| Combined filtrates, feed to Mo SX | 26.9 | 24.8 | — | 86 |
| Aqueous raffinate from Mo SX | 0.12 | 24.8 | — | 64 |
| Loaded organic phase | 15.2 | | | |
| Conco. ammonium molybdate strip solu. | 135 | nil | | |
| Barren organic phase after stripping | <0.2 | | | |
| Oxidation in autoclave stage, % | | | 99.0 | |
| Dissolution in autoclave stage, % | 85.7 | 99.8 | | |
| Dissolution in digestion stage, % | 13.3 | 0.0 | | N/A |
| Stage recovery from autoclave feed solids to Mo SX feed solution, % | 99.0 | 99.8 | | |
| Stage recovery from SX feed solution to conc. strip solution, % | 99.5 | <0.1 | | |
| Distribution of metal values, % | | | | |
| conc. strip solution | 98.5 | <0.1 | N/A | N/A |
| Mo SX raffinate solution | 0.5 | 99.8 | | |
| digestion residue solids | 1.0 | 0.2 | | |

N/A - Not Applicable

EXAMPLE 3

Ammonia Digestion

A portion of bulk molybdenum concentrate sample PP2, the source of which is described in Example 2, was used as feed material in a test of the embodiment of the invention shown in FIG. 2. This test employed a continuous pilot-scale autoclave for the oxidation stage of the process. The concentrate was reground to an 80% passing size of about 33 microns. A slurry of about 10% solids was prepared from this reground concentrate using demineralized water. The slurry was continuously injected into a horizontal autoclave of approximately 25 L working volume containing four separately agitated, equal-sized compartments in series. The temperature and pressure of the autoclave were maintained at about 220 C and 423 psig. Additional demineralized water was continuously injected into the second, third, and fourth compartments of the autoclave in amounts calculated to mimic the cooling water requirements of a commercial-scale autoclave. Gaseous oxygen was sparged into the slurry in each compartment in amounts slightly in excess of that required for the sulfide oxidation reactions expected to occur in each compartment. Unreacted oxygen was vented from the vapor space of the autoclave.

Product slurry was periodically discharged from the last compartment of the autoclave to a flash vessel where the sudden drop in pressure to ambient conditions caused steam to flash from the slurry, cooling it to about 95 C. Average residence time of solids in the autoclave was about 2.8 hours. Autoclave discharge slurry from the flash vessel, at about 15% solids, was collected in buckets and sampled for assay. A solids weight loss of 33% occurred in the autoclave treatment.

A portion of the collected autoclave discharge slurry was filtered, and the filter cake was washed with demineralized water. The washed cake was reslurried with a 3 normal ammonium hydroxide solution and agitated for 1 hour. The digestion slurry was filtered, yielding a concentrated ammonium molybdate solution, and the filter cake was washed with demineralized water. A solids weight loss of 44% occurred in digestion. Digestion residue solids, consisting predominantly of gangue minerals, represented 38% of the original mass of autoclave feed solids. Wash filtrates, containing low concentrations of molybdenum, were weighed and assayed in this laboratory test but would, in a commercial application, be recycled as feed water to earlier stages of the process for recovery of their contained molybdenum.

Recovery of molybdenum contained in the autoclave discharge filtrate solution by solvent extraction was not included in this test, the efficiency of that portion of the process having been adequately demonstrated in other tests, including Examples 2 and 4.

Feed and product assays as well as stage recoveries of molybdenum and copper achieved in this test are summarized in Table 5.

TABLE 5

Ammonia Digestion Test Results

| | Assay, % solids, g/l solutions | | | |
| --- | --- | --- | --- | --- |
| | Mo | Cu | $S^{-2}$ | $H_2SO_4$ |
| Autoclave feed solids | 27.1 | 1.85 | 18.1 | — |
| Autoclave feed solutions | — | — | — | — |
| Autoclave discharge filtrate solution | 4.74 | 2.59 | — | 63 |
| Autoclave residue solids | 29.0 | <0.01 | 0.05 | — |
| $NH_4OH$ digestion primary filtrate | >50 | — | — | — |
| $NH_4OH$ digestion residue solids | 0.14 | <0.01 | 0.1 | — |
| Oxidation in autoclave stage, % | N/A | N/A | 99.5 | N/A |
| Distribution of metal values, % | | | | |
| conc. digestion filtrate | 85.2 | <0.1 | N/A | N/A |
| Autoclave disch. solution | 14.5 | >99.9 | | |
| digestion residue solids | 0.3 | <0.1 | | |
| Projected Distribution of metal values with inclusion of Mo SX stage, % | | | N/A | N/A |
| conc. digestion filtrate | 85.2 | <0.1 | | |
| conc. SX strip solution | ≧14.0 | <0.1 | | |
| Mo SX raffinate solution | ≦0.5 | >99.9 | | |
| digestion residue solids | 0.3 | <0.1 | | |

N/A - Not Applicable

EXAMPLE 4

Lime Digestion

Figure 3:
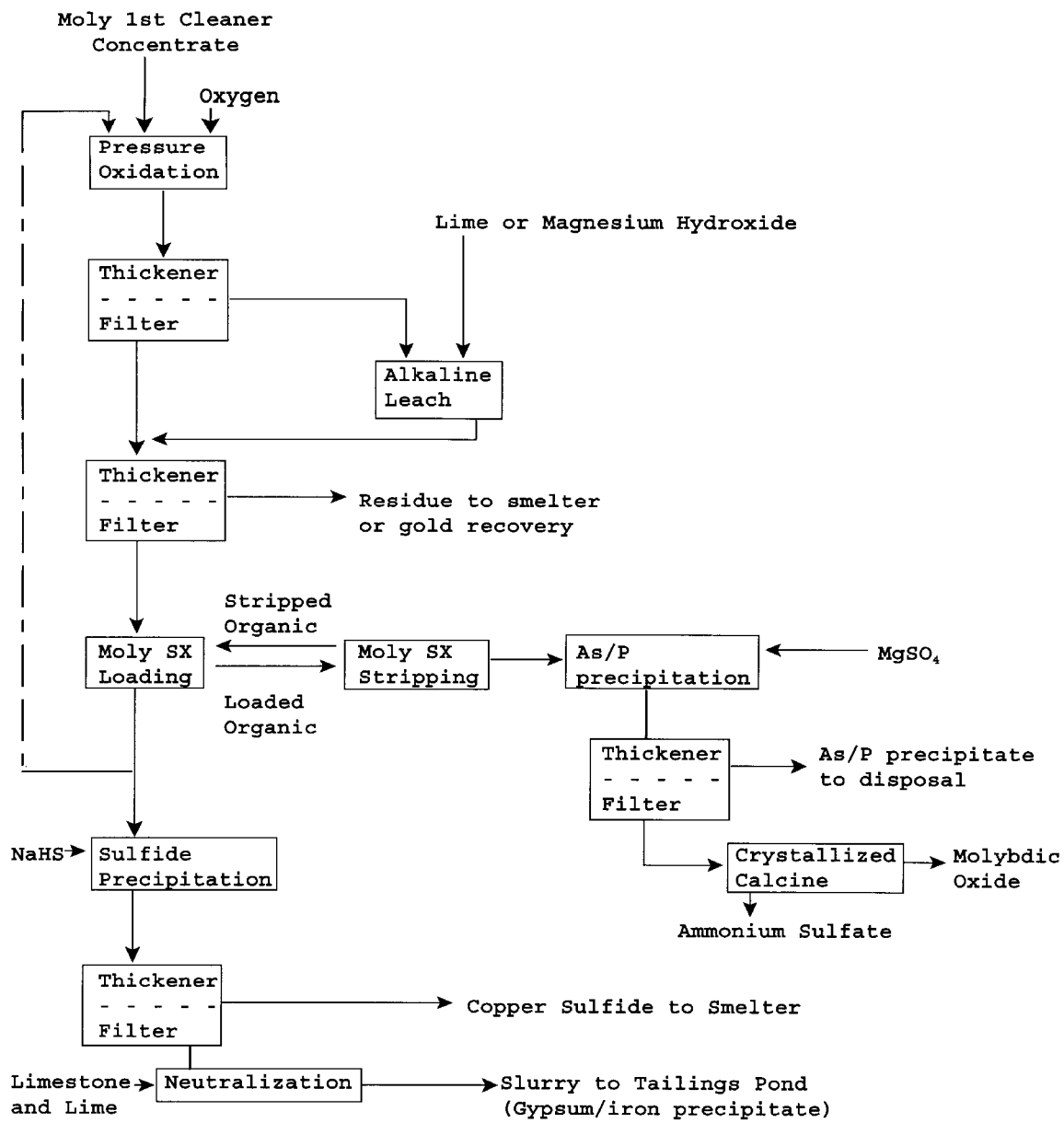
FIG. 3 is a schematic flow diagram of another embodiment of the process of this invention in which insoluble $MoO_3$ is converted to a soluble form through the action of lime.

A portion of bulk molybdenum concentrate sample PP2, the source of which is described in Example 2, was used as feed material in a test of the embodiment of the invention shown in FIG. 3 in which solid $MoO_3$ is converted to an acid soluble molybdate through the action of lime and, as an optional step in the process, a portion of the molybdenum solvent extraction raffinate solution can be recycled to the autoclave.

As one step in a series of locked cycle tests, a 13% solids slurry of the PP2 sample was prepared using a mixture of molybdenum solvent extraction raffinate solution from Example 2 (56% of total mass) and demineralized water (31% of total). The slurry mixture was placed in an agitated batch autoclave, the temperature and pressure of the autoclave was brought to and controlled at about 200 C and 310 psig, and oxygen gas was sparged into the slurry for a period of 2 hours. Pressure on the autoclave was then relieved and the oxidized slurry was cooled to about 90 C, a small sample of the slurry removed for assay, and the remaining slurry was filtered. The filter cake was washed with demineralized water.

Filtered and washed autoclave residue solids were repulped at about 55 C with demineralized water and hydrated lime at 30% solids. A total of 0.8 kg of $Ca(OH)_2$ per kg of Mo in the autoclave residue was used, yielding a pH of about 9. The limed slurry was agitated for 2 hours, during which the solid molybdenum trioxide in the residue was converted to calcium molybdate (which is soluble in acid solutions).

The limed slurry was then recombined with the acidic autoclave discharge filtrate solution and the mixture was agitated for an additional 1 hour during which the calcium molybdate formed in the liming stage was digested to form soluble molybdic acid and a calcium sulfate precipitate. The slurry was then filtered and the filter cake washed with demineralized water. Accounting for removal of assay samples, digested residue solids contained 68% of the original mass of autoclave feed solids.

The primary and first wash filtrates from the autoclave discharge were combined with the primary filtrate from the digestion stage. Secondary wash filtrates, containing low concentrations of molybdenum, were weighed and assayed in this laboratory example but in a commercial application would be recycled and used as feed water in earlier stages of the process for recovery of their contained molybdenum values.

Molybdenum was recovered from the combined filtrate by solvent extraction using a tertiary amine extractant in an aromatic organic solvent (the barren organic phase produced in Example 2). Molybdenum was recovered from the loaded organic phase by stripping with a 3 to 4 normal ammonium hydroxide solution producing a concentrated ammonium molybdate aqueous solution. After stripping, the barren organic phase was reused in the solvent extraction stage of the next locked cycle test.

Feed and product assays as well as stage recoveries of molybdenum and copper achieved in this test are summarized in Table 6. In this Example, a majority of the molybdenum lost to the digestion residue solids is present as unoxidized molybdenite. Overall molybdenum recovery to concentrated ammonium molybdate solution could be improved from the 94.8% achieved in this Example though the use of autoclave conditions which will achieve more complete oxidation of sulfide sulfur, such as those shown in Example 3.

TABLE 6

Lime Digestion Test Results

| | Assay, % solids, g/l solutions | | | |
|---|---|---|---|---|
| | Mo | Cu | $S^{-2}$ | $H_2SO_4$ |
| Autoclave feed solids | 29.1 | 1.93 | 20.4 | — |
| Recycled Mo SX raffinate to autoclave | 0.12 | 24.8 | — | 64 |
| Primary & first wash autoclave filtrate | 7.88 | 18.1 | — | 132 |
| Autoclave residue solids | 29.1 | 0.01 | 0.88 | — |
| Lime digestion solids | 1.48 | 0.01 | 0.86 | |
| Digestion filtrate, feed to Mo SX | 38.0 | 16.1 | — | 99 |
| Aqueous raffinate from Mo SX | 0.09 | 16.6 | — | 64 |
| Loaded organic phase | 15.8 | | | |
| Conc. ammonium molybdate strip solu. | 140 | nil | | |
| Barren organic phase | <0.2 | | | |
| Oxidation in autoclave stage, % | | | 96.6 | |
| Dissolution in autoclave stage, % | 20.3 | 99.6 | | |
| Dissolution in digestion stage, % | 74.7 | 0.0 | | |
| Stage recovery from autoclave feed solids to Mo SX feed solution, % | 95.0 | 99.8 | | N/A |
| Stage recovery from SX feed solution to conc. strip solution, % | 99.8 | <0.1 | | |
| Distribution of metal values, % | | | | |
| conc. strip solution | 94.8 | <0.1 | | |
| Mo SX raffinate solution | 0.2 | 99.6 | N/A | N/A |
| digestion residue solids | 5.0 | 0.4 | | |

N/A - Not Applicable

Figure 6:
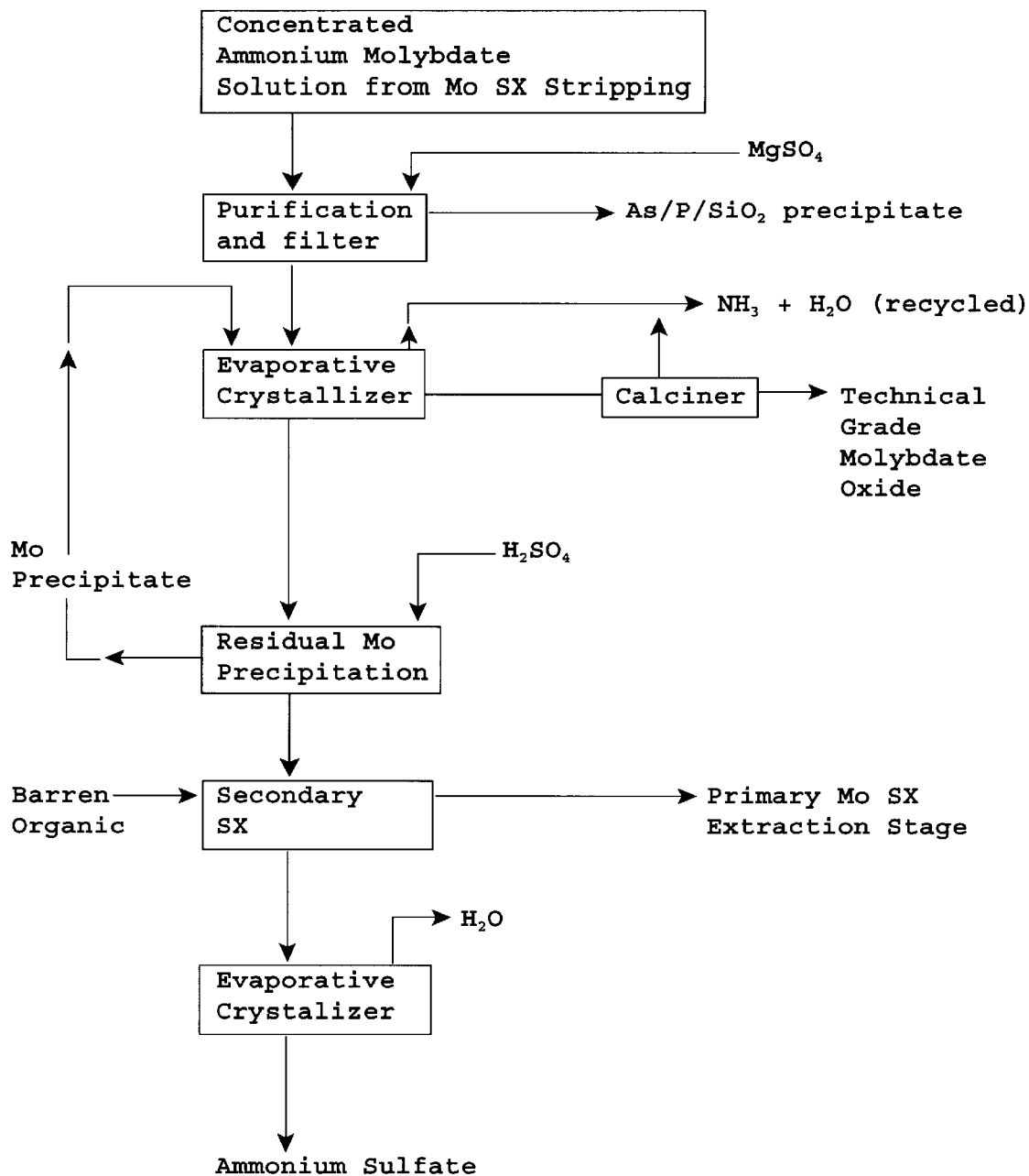
FIG. 6 is a schematic flow diagram for the production of technical grade molybdenum trioxide from concentrated ammonium molybdate solution.

EXAMPLE 5
Production of Technical Grade $MoO_3$ from Concentrated Ammonium Molybdate Solution Concentrated ammonium molybdate strip solutions produced in a series of 7 locked cycle tests of various embodiments of this invention, including those tests described in Examples 2 and 4, were combined for recovery of their contained molybdenum in accordance with the flowsheet illustrated in FIG. 6. This combined strip solution contained 132 g/l Mo and also contained 0.06 g/l As, 0.38 g/l $P_2O_5$, and 38 g/l $SO_4$ as solution impurities as well as 0.09 g/l $SiO_2$ as a solid suspension. Magnesium sulfate was added at a rate of 2.9 g/l of solution to precipitate arsenic and phosphorous impurities as magnesium salts. The solution was then filtered to remove the precipitated impurities, and the filter cake washed with demineralized water then dried. The recovered solids totaled 5.7 g/l of strip solution and contained 2.2% As, 8.3% $P_2O_5$, 47% $SiO_2$, and 2.8% Mo, representing a recovery loss of 0.12% of the molybdenum contained in the strip solution.

The purification filtrate was evaporated under vacuum at about 70 C to 23% of the original strip solution volume during which a majority of the contained molybdenum precipitated as ammonium dimolybdate (ADM) crystals, $(NH_4)_2Mo_2O_7$. The resulting crystal slurry was filtered, yielding 202 g of ADM product per L of purified strip solution. The ADM product contained 80.5% of the Mo in feed solution. The extent of evaporation in this test exceeded optimum levels, and approximately 14% of the contained sulfate in the purification filtrate was also precipitated as ammonium sulfate salt, contaminating the ADM product. In commercial practice, evaporation would be limited to a volume reduction which would not exceed the solubility limit of the contained ammonium sulfate.

A portion of the ADM product was calcined in a laboratory furnace for 1 hour at about 550 C to drive off the contained ammonia and impurity sulfate to produce $MoO_3$. Assayed grades of the ADM and $MoO_3$ products are summarized in Table 7. Despite the nonoptimum evaporation levels employed and the relatively high sulfur content the ADM, the $MoO_3$ produced easily met the minimum quality specification for technical grade molybdenum trioxide.

TABLE 7

ADM and Molybdenum Trioxide Grades Produced

| Element/ | Assay, % | |
|---|---|---|
| Compound | ADM product | $MoO_3$ product |
| Mo | 52.6 | 62.7 |
| S | 0.89 | 0.10 |
| $SiO_2$ | — | 0.30 |
| Cu | — | 0.004 |
| As | — | 0.002 |
| P | — | 0.002 |
| Pb | — | <0.001 |

The crystallization filtrate contained 111 g/l Mo, 103 g/l $NH_3$, and 206 g/l $SO_4$. A portion of this filtrate was tested for recovery of its residual contained molybdenum. The pH of the filtrate was adjusted to between 4 and 5 by addition of sulfuric acid, and it was held for 6 hours at a temperature of about 45 C. Eighty seven percent of the contained molybdenum was precipitated and recovered by filtration. The precipitate contained 43.4% Mo, and its major crystalline species (identified by x-ray diffraction) were $(NH_4)_6Mo_7O_{24} \cdot H_2O$, and $MoO_3 \cdot H_2O$. In a commercial operation this precipitate would be recycled to the crystallizer where the contained molybdenum would be converted to ADM, recovered in the ADM product, and calcined to $MoO_3$.

The Mo precipitation filtrate contained a residual 7.6 g/l Mo. This molybdenum was recovered by secondary solvent extraction in a single stage with an organic solvent identical to that used in Examples 2 and 4. The loaded organic contained 3.1 g/l Mo and was not processed further in this test. In a commercial application, it would be returned to the first extraction stage of the solvent extraction circuit used to recover Mo from autoclave discharge solution, and its contained molybdenum would be recovered in the concentrated strip solution.

The raffinate solution from secondary solvent extraction contained 387 g/l $SO_4$, 145 g/l $NH_3$, and <0.01 g/l Mo. It was evaporated to dryness producing an ammonium sulfate crystalline product which was assayed and met all quality criteria for marketing as a commercial fertilizer.

Based on these results, overall recovery of molybdenum contained in concentrated strip solution to a final technical grade molybdenum trioxide product for the flowsheet illustrated in FIG. 6 is >99.8%.

EXAMPLE 6
Comparative Molybdenum Recoveries From Ore

Examples 1 through 5 describe laboratory experiments on various process stages of three embodiments of the invention, and these Examples document the stage recoveries of molybdenum achieved in the process steps. Table 8 illustrates the projected overall recovery of molybdenum contained in Bingham Canyon ore which may be achieved through the implementation of these three embodiments of the invention, based on the results of Examples 1 through 5. For comparative purposes, Table 8 also lists the molybdenum recovery achieved at the Bingham Canyon mine using conventional roasting technology as described in the Comparative Example.

TABLE 8

Comparative Overall Molybdenum Recoveries from Bingham Canyon Ore

| | Recoveries & losses of Mo contained in ore, % | | | |
|---|---|---|---|---|
| | Conven. Roasting Process | Soda Ash Dig.* (FIG. 1) | Ammonia Dig.* (FIG. 2) | Lime Dig.* (FIG. 3) |
| Losses to bulk Cu—Mo flotation tails | 15.7 | 15.7 | 15.7 | 15.7 |
| Losses to final Cu conc., smelter feed | 33.9 | 8.2 | 8.2 | 8.2 |
| Feed to $MoO_3$ conversion process, | | | | |
| commercial roaster | 50.4 | | | |
| this invention | | 76.1 | 76.1 | 76.1 |
| Conversion process losses, | | | | |
| commercial roaster | 0.5 | | | |
| alkali digestion solids | | 0.8 | 0.2 | 3.8 |
| Mo SX raffinate solution | | 0.4 | ≤0.4 | 0.2 |
| Strip solution purification solids | | 0.2 | 0.2 | 0.2 |
| Ammonium sulfate product | | nil | nil | nil |
| Allowance for additional unidentified losses not seen in testwork | | 2.0 | 2.0 | 2.0 |
| Overall Recovery to marketable technical grade $MoO_3$ product | 49.9 | 72.7 | ≥73.3 | 69.9 |

*Dig. = Digestion

EXAMPLE 7

Comparison of Aliphatic and Aromatic Solvents

The use of aliphatic and aromatic solvents in the extraction of soluble molybdenum values from an aqueous mixture using an amine is demonstrated by the data presented below. These data show the difference between aliphatic and aromatic solvents as diluents for Alamine 336. These data show that the solubility of molybdate-amine and the Si-, As-, P-molybdate-amine complexes are higher in the aromatic solvent. In addition, no modifier (isodecanol) was needed with the aromatic solvent. Normally, a modifier is added to the amine when diluted with an aliphatic diluent to increase the solubility of the extracted complex in the organic solvent.

The test procedure and reagents are described below:

| | |
|---|---|
| Leach solution | Autoclave leach solution Assay = 19 g/l Mo, 53 g/l Cu, 17 g/l Fe, 81 g/l H2SO4 |
| Alamine 336 | Tricaprylyl tertiary amine extractant |
| Exxal 10 | Isodecanol modifier |
| Escaid 110 | Aliphatic petroleum solvent, diluent |
| Aromatic 150 | Aromatic petroleum solvent, diluent |
| Organics | Organic 1 = 5 vol % Alamine 336 + 5 vol % Exxal 10 in aliphatic Escaid 110 Organic 2 = 5 vol % Alamine 336 in Aromatic 150 |

TABLE 9-A

Test 1 with organic 1 (aliphatic diluent)

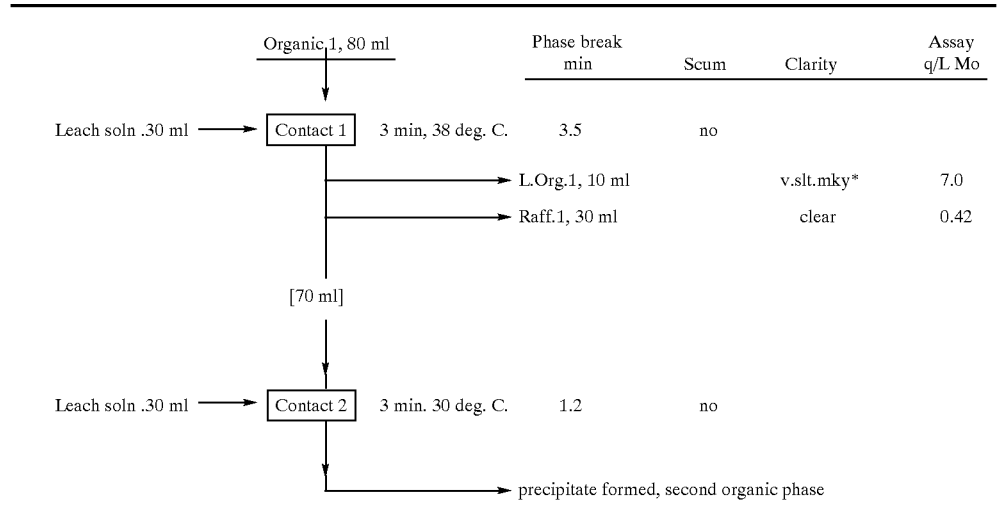

*very slightly murky

TABLE 9-B

Test 2 with organic 2 (aromatic diluent

| | | P/S min | Scum | Clarity | Assay q/L Mo |
|---|---|---|---|---|---|
| Organic 2, 100 ml | | | | | |
| Leach soln .30 ml → Contact 1 | 3 min, 35 deg. C. | .8 | no | | |
| → L.Org.1, 10 ml | | | | v.slt.mky* | 7.1 |
| → Raff.1, 30 ml | | | | clear | 0.36 |
| [90 ml] | | | | | |
| Leach soln .30 ml → Contact 2 | 3 min. 30 deg. C. | 1.2 | no | | |
| → L.Org.2, 10 ml | | | | v.slt.mky* | 13 |
| → Raff.2, 30 ml | | | | clear | 1.42 |
| [80 ml] | | | | | |
| Leach soln .30 ml → Contact 3 | 3 min. 30 deg. C. | 1.0 | no | | |
| → L.Org.3, 10 ml | | | | v.slt.mky* | 17 |
| → Raff.3, 30 ml | | | | clear | 8.5 |

Although the process of this invention has been described in considerable detail by the preceding examples. This detail is for the purpose of illustration only and is not to be construed as a limitation on the spirit and scope of the invention as described in the appended claims.

What is claimed is:

1. A process for producing molybdenum trioxide of at least technical grade from molybdenite concentrate containing molybdenite, at least one of copper in excess of 5 wt % or naturally floatable gangue minerals in excess of 10 wt %, each based on the weight of the concentrate, the process comprising the steps of:
   A. contacting an aqueous suspension of the concentrate with oxygen under a partial pressure of free oxygen of between about 75 and 200 psi and at a temperature of at least about 150 C such that at least about 95% of the molybdenite is oxidized to form a soluble hydrous molybdic oxide and insoluble molybdenum trioxide;
   B. separating the soluble molybdic oxide from the insoluble molybdenum trioxide;
   C. contacting the insoluble molybdenum trioxide with a solubilization compound to form an aqueous mixture of soluble molybdate values and insoluble residue;
   D. separating the soluble molybdate values from the insoluble residue;
   E. combining the soluble molybdate values of step D with the soluble molybdic oxide of step A to form an aqueous mixture containing soluble molybdenum values;
   F. contacting the aqueous mixture of step E with an organic solvent containing an extractive compound that is selective for the molybdenum values such that a majority of the metal contaminants remain in the aqueous mixture while a majority of the molybdenum values are extracted into the organic solvent;
   G. removing the extracted molybdenum values of step F from the organic solvent by contacting the organic solvent with an aqueous solution containing a stripping reagent selective for molybdenum values;
   H. crystallizing the extracted molybdenum values of step G; and
   I. calcining the crystallized molybdenum values of step H to produce molybdenum trioxide.

2. The process of claim 1 in which the solubilization compound of step C is an alkali metal compound.

3. The process of claim 2 in which the alkali metal compound of step C is a sodium or potassium compound.

4. The process of claim 3 in which the alkali metal compound of step C is selected from the group consisting of sodium and potassium hydroxides, oxides, carbonates and bicarbonates.

5. The process in claim 4 in which the organic solvent is an aromatic organic solvent.

6. The process of claim 5 in which the extractive compound of Step E is a nonprimary amine, the molecular structure of which includes at least one hydrocarbon group containing 6 or more carbon atoms.

7. The process of claim 6 in which the extractive compound of step E is a tertiary amine.

8. The process of claim 7 in which the gangue minerals include talc and sericite.

9. The process of claim 8 in which the extracted molybdenum values of step F are removed through the action of ammonium hydroxide.

10. The process of claim 9 in which the concentrate is in the form of finely divided particles.

11. The process of claim 10 in which the particles have a size of less than about $P_{80}$ at 200 U.S. standard mesh.

12. The process of claim 11 in which the metal contaminants include copper, and comprising the further step of recovering the copper from the aqueous product of step F by sulfide precipitation.

13. The process of claim 12 comprising the further step of recovering the copper from the aqueous product of step F by an electrowinning technique.

14. The process of claim 7 in which copper is present in excess of 5 wt % and the gangue minerals are present in excess of 10 wt %.

15. The process of claim 1 in which the solubilization compound is ammonium hydroxide.

16. A process for producing molybdenum trioxide of at least technical grade from molybdenite concentrate containing molybdenite, at least one of copper in excess of 5 wt % or naturally floatable gangue minerals in excess of 10 wt %, each based on the weight of the concentrate, the process comprising the steps of:
   A. contacting an aqueous suspension of the concentrate with oxygen under a partial pressure of free oxygen of between about 75 and 200 psi and at a temperature of at least about 150 C such that at least about 95% of the molybdenite is oxidized to form a soluble hydrous molybdic oxide and insoluble molybdenum trioxide;
   B. separating the soluble molybdic oxide from the insoluble molybdenum trioxide;
   C. contacting the insoluble molybdenum trioxide with ammonium hydroxide to form soluble molybdate values;
   D. contracting the soluble molybdic oxide with an organic solvent containing an extractant that is selective for the soluble molybdic oxide such that a majority of the metal contaminants remain in the aqueous mixture while a majority of the soluble molybdic oxide is extracted into the organic solvent;
   E. removing the extracted molybdic oxide of step D from the organic solvent by contacting the organic solvent with an aqueous solution containing a stripping reagent selective for molybdenum;
   F. combining the soluble molybdate values of step C with the extracted molybdic oxide of step E to form a mixture of soluble molybdenum values;
   G. crystallizing the soluble molybdenum values of step F; and
   H. calcining the crystallized molybdenum values of step G to form molybdenum trioxide.

17. The process of claim 16 in which the organic solvent is an aromatic solvent.

18. A process for producing molybdenum trioxide of at least technical grade from molybdenite concentrate containing molybdenite, at least one of copper in excess of 5 wt % or naturally floatable gangue minerals in excess of 10 wt %, each based on the weight of the concentrate, the process comprising the steps of:
   A. contacting an aqueous suspension of the concentrate with oxygen under a partial pressure of free oxygen of between about 75 and 200 psi and at a temperature of at least about 150 C such that at least about 95% of the molybdenite is oxidized to form a soluble hydrous molybdic oxide and insoluble molybdenum trioxide;
   B. separating the soluble molybdic oxide from the insoluble molybdenum trioxide;
   C. contacting the insoluble molybdenum trioxide with at least one of lime and magnesium hydroxide to form a mixture containing soluble molybdate values;
   D. combining the mixture of step C with the soluble molybdic oxide fraction of step B to form a mixture of soluble molybdenum values;
   E. contacting the aqueous mixture of step D with an organic solvent containing an extractive compound that is selective for the molybdenum values such that a majority of the metal contaminants remain in the aqueous mixture while a majority of the molybdenum values are extracted into the organic solvent;
   F. removing the extracted molybdenum values of step E from the organic solvent by contacting the organic solvent with an aqueous solution containing a stripping reagent selective for molybdenum values;
   G. crystallizing the extracted molybdenum values of step F; and
   H. calcining the crystallized molybdenum values of step G to form molybdenum trioxide of at least a technical grade.

19. The process of claim 18 in which the organic solvent is an aromatic solvent.

* * * * *

UNITED STATES PATENT AND TRADEMARK OFFICE
CERTIFICATE OF CORRECTION

PATENT NO.   : 6,149,883

DATED        : November 21, 2000

INVENTOR(S)  : Ketcham, Victor., et al

It is certified that error appears in the above-identified patent and that said Letters Patent is hereby corrected as shown below:

Front page, second column [56] References Cited: Add the following line after the last line --4,555,387   11/85   Sabacky et al. ............423/59--.

Column 5, line 67: Insert "the pH" after --upon--.

Column 6, line 59: Delete (V).

Column 6, line 61: Replace "$Na_2MoO_4 + H_2SO_4 \rightarrow Na_2SO_4 + MoO_3 \cdot H_2O^{(soluble)}$" with --$Na_2MoO_4 + H_2SO_4 \rightarrow Na_2SO_4 + MoO_3 \cdot H_2O_{(soluble)}$--.

Column 8, line 49: Replace "$(NH_4)_2MoO_4 + H_2SO_4 \rightarrow MoO_3 \cdot H_2O_{(solid)} + (NH_4)_2SO4$" with --$(NH_4)_2MoO_4 + H_2SO_4 \rightarrow MoO_3 \cdot H_2O_{(solid)} + (NH_4)_2SO_4$--.

Column 9, line 59: Replace "$MoO_{3(soluble)} + 2NH_4OH \rightarrow (NH_4)_2 MoO_{4(soluble)} + H_2O$" with --$MoO_{3(insoluble)} + 2NH_4OH \rightarrow (NH_4)_2 MoO_{4(soluble)} + H_2O$--.

Column 10, line 13: Replace "$MoO_{3(soluble)} + Mg(OH)_2 \rightarrow MgMoO_{4(acid\ soluble)} + H_2O$" with --$MoO_{3(insoluble)} + Mg(OH)_2 \rightarrow MgMoO_{4(acid\ soluble)} + H_2O$--.

Signed and Sealed this

Fifteenth Day of May, 2001

NICHOLAS P. GODICI

*Attest:*

*Attesting Officer*   *Acting Director of the United States Patent and Trademark Office*